(12) United States Patent
Rhoads

(10) Patent No.: US 9,959,588 B2
(45) Date of Patent: May 1, 2018

(54) METHODS AND SYSTEMS FOR SIGNAL PROCESSING

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days. days.

(21) Appl. No.: 15/331,433

(22) Filed: Oct. 21, 2016

(65) Prior Publication Data

US 2017/0132743 A1    May 11, 2017

Related U.S. Application Data

(62) Division of application No. 13/918,559, filed on Jun. 14, 2013, now Pat. No. 9,477,884.

(60) Provisional application No. 61/659,816, filed on Jun. 14, 2012.

(51) Int. Cl.
*G06K 9/00* (2006.01)
*G06T 1/00* (2006.01)
*H04L 9/14* (2006.01)
*H04L 9/30* (2006.01)
(Continued)

(52) U.S. Cl.
CPC ........ *G06T 1/0064* (2013.01); *G06K 9/00442* (2013.01); *H04L 9/14* (2013.01); *H04L 9/30* (2013.01); *H04L 63/0428* (2013.01); *H04W 12/02* (2013.01); *G06T 2201/0051* (2013.01);
(Continued)

(58) Field of Classification Search
None
See application file for complete search history.

(56) References Cited

U.S. PATENT DOCUMENTS 6,483,927 B2   11/2002   Brunk et al.
6,580,809 B2    6/2003   Stach et al.
6,631,198 B1   10/2003   Reed
(Continued)

FOREIGN PATENT DOCUMENTS

WO    WO2013188807    12/2013

OTHER PUBLICATIONS

Prosecution excerpts from U.S. Appl. No. 14/057,424, including applicant correspondence dated Oct. 18, 2013 and Jun. 2, 2015, and Office correspondence dated Mar. 6, 2015.
(Continued)

*Primary Examiner* — Nirav G Patel
(74) *Attorney, Agent, or Firm* — Digimarc Corporation

(57) ABSTRACT

An object (e.g., a driver's license) is tested for authenticity using imagery captured by a consumer device (e.g., a mobile phone camera). Corresponding data is sent from the consumer device to a remote system, which has secret knowledge about features indicating object authenticity. The phone, or the remote system, discerns the pose of the object relative to the camera from the captured imagery. The remote system tests the received data for the authentication features, and issues an output signal indicating whether the object is authentic. This testing involves modeling the image data that would be captured by the consumer device from an authentic object—based on the object's discerned pose (and optionally based on information about the camera optics), and then comparing this modeled data with the data sent from the consumer device. A great variety of other features and arrangements are also detailed.

20 Claims, 10 Drawing Sheets

(51) Int. Cl.
*H04L 29/06* (2006.01)
*H04W 12/02* (2009.01)

(52) U.S. Cl.
CPC ............... *G06T 2201/0601* (2013.01); *H04L 2209/608* (2013.01); *H04L 2209/80* (2013.01)

(56) References Cited

U.S. PATENT DOCUMENTS

| | | | |
|---|---|---|---|
| 6,724,914 | B2 | 4/2004 | Brundage et al. |
| 6,993,190 | B1 | 1/2006 | Nguyen |
| 7,111,170 | B2 | 9/2006 | Rhoads |
| 7,676,060 | B2 | 3/2010 | Brundage et al. |
| 7,688,996 | B2 | 3/2010 | Bradley |
| 7,822,969 | B2 | 10/2010 | Anglin |
| 8,121,843 | B2 | 2/2012 | Rhoads et al. |
| 8,694,049 | B2 | 4/2014 | Sharma et al. |
| 2010/0111301 | A1 | 5/2010 | Wanderley |
| 2010/0165158 | A1 | 7/2010 | Rhoads |
| 2010/0322469 | A1 | 12/2010 | Sharma |
| 2010/0325117 | A1 | 12/2010 | Sharma |
| 2011/0244919 | A1 | 10/2011 | Aller et al. |
| 2011/0319056 | A1 | 12/2011 | Toy et al. |
| 2012/0116559 | A1 | 5/2012 | Davis et al. |
| 2012/0134548 | A1 | 5/2012 | Rhoads et al. |
| 2012/0300972 | A1 | 11/2012 | Rodriguez |
| 2013/0173915 | A1 | 7/2013 | Haulund |
| 2014/0342773 | A1 | 11/2014 | Sharma et al. |

OTHER PUBLICATIONS

PCT International Search Report in PCT/US13/45955 (published as WO2013188807), dated Mar. 10, 2014.

PCT Written Opinion of the International Searching Authority in PCT/US13/45955 (published as WO2013188807), dated Mar. 10, 2014.

| $\xi+4$ | $\xi+1$ | $\xi+4$ | $\xi+1$ | $\xi+4$ | $\xi+1$ |
|---|---|---|---|---|---|
| $\xi+1$ | $\xi+4$ | $\xi+1$ | $\xi+4$ | $\xi+1$ | $\xi+4$ |
| $\xi+4$ | $\xi+1$ | $\xi+4$ | $\xi+1$ | $\xi+4$ | $\xi+1$ |
| $\xi+1$ | $\xi+4$ | $\xi+1$ | $\xi+4$ | $\xi+1$ | $\xi+4$ |
| $\xi+4$ | $\xi+1$ | $\xi+4$ | $\xi+1$ | $\xi+4$ | $\xi+1$ |
| $\xi+1$ | $\xi+4$ | $\xi+1$ | $\xi+4$ | $\xi+1$ | $\xi+4$ |

FIG. 6

| $\xi+4$ | $\xi+1$ | $\xi+4$ |
|---|---|---|
| $\xi+1$ | $\xi+4$ | $\xi+1$ |
| $\xi+4$ | $\xi+1$ | $\xi+4$ |
| $\xi+1$ | $\xi+4$ | $\xi+1$ |
FIG. 7
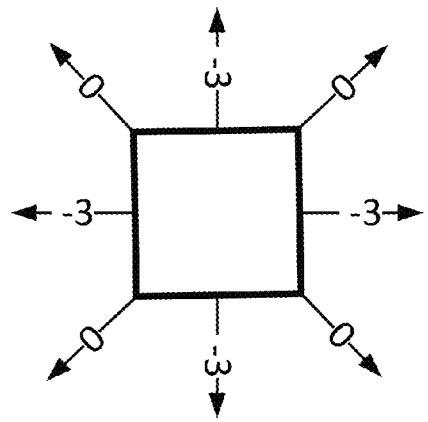
FIG. 7A
| $\xi+4$ | $\xi+1$ | $\xi+4$ |
|---|---|---|
| $\xi+1$ | $\xi+4$ | $\xi+1$ |
| $\xi+4$ | $\xi+1$ | $\xi+4$ |
| $\xi+1$ | $\xi+4$ | $\xi+1$ |
FIG. 8
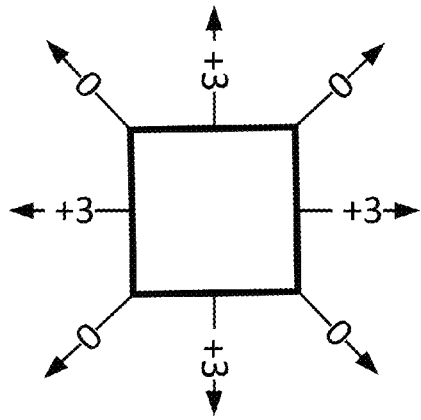
FIG. 8A

| $\xi+4$ | $\xi+1$ | $\xi+4$ | $\xi+1$ | $\xi+4$ | $\xi+1$ |
|---------|---------|---------|---------|---------|---------|
| $\xi+1$ | $\xi+4$ | $\xi+1$ | $\xi+4$ | $\xi+1$ | $\xi+4$ |
| $\xi+4$ | $\xi+1$ | $\xi+4$ | $\xi+1$ | $\xi+4$ | $\xi+1$ |
| $\xi+1$ | $\xi+4$ | $\xi+1$ | $\xi+4$ | $\xi+1$ | $\xi+4$ |
| $\xi+4$ | $\xi+1$ | $\xi+4$ | $\xi+1$ | $\xi+4$ | $\xi+1$ |
| $\xi+1$ | $\xi+4$ | $\xi+1$ | $\xi+4$ | $\xi+1$ | $\xi+4$ |

FIG. 9

| | 92 | 94 | 96 |
|---|---|---|---|
| | ξ+1 | ξ+1 | ξ+1 |
| | ξ+1 | ξ+2 | ξ+1 |
| | ξ+1 | ξ+1 | ξ+1 |
| | ξ+1 | ξ+2 | ξ+1 |
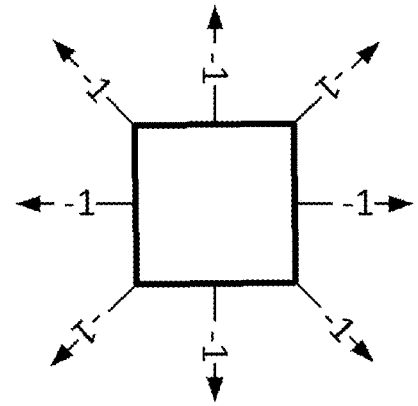
FIG. 12A
FIG. 12
| | 92 | 94 | 96 |
|---|---|---|---|
| | ξ+1 | ξ+1 | ξ+1 |
| | ξ+1 | ξ+2 | ξ+1 |
| | ξ+1 | ξ+1 | ξ+1 |
| | ξ+1 | ξ+2 | ξ+1 |
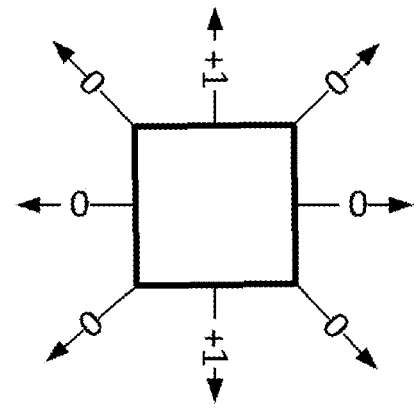
FIG. 13A
FIG. 13

METHODS AND SYSTEMS FOR SIGNAL PROCESSING

RELATED APPLICATION DATA

This application is a divisional of application Ser. No. 13/918,559, filed Jun. 14, 2013 (now U.S. Pat. No. 9,477, 884), which claims priority benefit to provisional application 61/659,816, filed Jun. 14, 2012. These applications are incorporated herein by reference.

INTRODUCTION

Digital watermark technology is known, e.g., from Digimarc's U.S. Pat. Nos. 6,408,082, 6,590,996 and 7,046,819, and publications 20060013395 and 20110274310.

As is familiar to artisans, and as detailed in the cited patents, a digital watermark steganographically conveys a payload of hidden auxiliary data, e.g., in imagery. It also typically includes a watermark orientation signal. This orientation signal (which can comprise a known reference signal in a transform domain, such as a constellation of impulses in the spatial frequency domain) enables a watermark detector to discern how the image submitted for decoding has been geometrically transformed since it was originally encoded. For example, the orientation signal (which may be called a calibration signal or reference signal) allows the detector to discern an amount by which the image has been shifted in X- and Y-directions (translation), an amount by which it has been changed in scale, and an amount by which it has been rotated. Other affine transform parameters (e.g., shear) may also be determined. It can even assist in classic lens distortion characterization and subsequent compensation. With knowledge of such "pose" information, the watermark detector can compensate for the geometrical distortion of the image since its original watermarking, and can correctly extract the payload of hidden auxiliary data (watermark message).

In watermark detection, the underlying (host) image is often regarded as noise that should be attenuated prior to watermark decoding. This is commonly done by a Wiener-like filter, e.g., subtracting from each pixel value a local average of nearby pixel values. One particular such technique involves processing the image so that each pixel is expressed by its difference (gradient) in value relative to one or more adjoining pixels. (Each pixel has eight neighbors: the one to the north, northeast, east, southeast, south, southwest, west, and northwest.) Watermark decoding is commonly performed on a set of data representing these local gradients within the imagery. In some implementations, only the sign of the gradient is considered, i.e., whether the value of one pixel is greater than, less than, or equal to the value of one or more adjoining pixels. Such technology is detailed in Digimarc's U.S. Pat. Nos. 6,580,809, 6,724,914, 6,631, 198, 6,483,927, 7,688,996 and publications 20100325117 and 20100165158, and may be referred-to as "oct-axis" filtering.

For example, U.S. Pat. No. 6,580,809 notes:

"For each image sample, [the process] compares the sample with each of its eight neighboring image samples. The filter replaces the value at the center sample with a value that is incremented each time the center sample value is greater than a neighbor value and decremented each time the center sample is less than the neighbor value. In particular, for each comparison, the filter increments by a value of 1 if the center sample is greater than its neighbor, it increments by a value of −1 if the center sample is less than its neighbor, and makes no change otherwise. The output of the filter will be between −8 and +8 when an eight neighborhood (3 by 3 sample region) is used in the filter implementation. Such type of a filter has a number of applications such as edge detection, signal enhancement, etc. in signal processing and operates on different media types (image, video and audio) and samples in various domains. For digital watermark applications, it may be used to estimate the original host signal and watermark signal, where the watermark signal is applied as an additive, antipodal PN signal."

"The filter discussed in the previous paragraph may be implemented in variety of ways. One particular implementation makes comparisons between the center sample and each neighboring sample, and transforms the result of this comparison to an increment or decrement value (e.g., +k or −k, where k is a constant like 1, 2, 3, etc.). The filter sums each of the increment/decrement values from each neighbor, and then replaces the center sample value with the result of the summation. This type of filter can be implemented efficiently using a look up table. For example, the comparison operation is performed by subtracting the center sample value from a neighbor sample value to produce a difference value (−255 to +255 for an 8 bit sample). The result is then fed to a look-up table, which maps the difference value to an increment/decrement value and outputs that value. The filter sums the look-up table output for each neighbor in the neighborhood, and replaces the center sample with the result of the summation. This neighborhood may be the eight neighbors in 3 by 3 block of samples, the adjacent samples in a one-dimensional signal, the horizontally and/or vertically adjacent neighbors in a two or more dimensional signal, etc. The size of the neighborhood may be increased as well. The look-up table may be used to implement a variety of non-linear filters efficiently."

Cited document 20100325117 notes "The simplest approach to deriving binarized fingerprints from the Octaxis signatures is to treat each output value as a 5-bit quantity."

Generally, watermark decoding involves two stages. First, the pose information is discerned. Then, with this knowledge, the payload of auxiliary data is extracted. This second stage may involve key data, e.g., so that only decoders having knowledge of this key can obtain the auxiliary data. (The key data may be used, e.g., to decrypt the watermark message, and/or to control the generation of a watermark carrier signal, and/or to control a mapping of information bits in the message to positions in a watermark information signal, etc.)

As camera-equipped portable processing devices (e.g., smartphones) proliferate, so do the opportunities for watermark technology. However, in some applications, it is undesirable for watermark key information to be similarly proliferated. If key data is widely distributed (e.g., in every smartphone), certain watermarks might be reverse-engineered and mimicked by parties unauthorized to do so. In common cryptographic-art terms, the keys are being distributed and this has always been considered a crypto no-no if one is desiring an analytically clean cryptographic system.

In accordance with one aspect of the present technology, a smartphone captures imagery from a subject, using the smartphone camera. The smartphone performs some initial processing on the image data, such as discerning pose information. But decoding of the watermark to extract the payload data is performed by a cloud processor—obviating the need for the smartphone to have the watermark key.

In one embodiment, the smartphone alerts a cloud processor that it has captured imagery from which it wants a watermark payload extracted, and provides the image dimensions (e.g., 1920×1080 pixels). The cloud processor responds by asking the smartphone to send it pose information for the image, together with intra-image gradient information for, e.g., 50,000 different locations in the image (typically randomly distributed).

The smartphone sends the requested data to the cloud processor (commonly encrypted with a public key of the cloud processor). On receipt (and decryption), the cloud processor processes this sparse set of image (gradient) information, with the pose information and with key information, to extract the watermark payload data. (The watermark data is typically encoded redundantly in the image data, e.g., in repetitive, tiled fashion, so it can be statistically discerned from grossly incomplete sets of image information.) The cloud processor then sends this decrypted data back to the smartphone (optionally encrypted with a public key associated with the smartphone). The so-called keys utilized in the watermark payload extraction thus need not be shared with the smartphone and hence the key distribution crypto-weakness is bypassed. The cloud processor, meanwhile, performs this processing with only a sparse set of image gradient information (i.e., for only 50,000 of the 2+million pixels in the image), affording as this does a high level of separation between the need to send a full image to the cloud—which is both inefficient as well as paranoia inducing for some—and just some small chunk of data having little human-interpretable visual content.

In another particular embodiment, the smartphone captures imagery from an object—such as a driver's license—having authentication markings. These features are too small to be resolved (distinguished) by the smartphone camera, but they subtly bias the luminance (and/or chrominance) of the pixels captured by the camera.

In this case, the smartphone processes the captured imagery to extract a watermark payload, e.g., indicating (e.g., by an index value) that the license was issued by the Oregon Department of Motor Vehicles, and indicating a cloud processor (by URL) to which data can be referred for license authentication.

The smartphone contacts the indicated cloud processor, providing information about the image it wants processed for authentication (e.g., the image dimensions, and information about the smartphone camera—such as its modulation transfer function).

The cloud processor responds by identifying, e.g., 100,000 random pixel locations for which it wants intra-image gradient information, with a corresponding direction for each.

The smartphone responds with the requested gradient information, together with pose information that it discerned during its extraction of the watermark payload.

In this case the cloud processor is not a repository for a secret watermark key, but rather is a repository for information about a pattern of authentication markings that should be found on valid driver's licenses. The cloud processor models how evidence of these markings should be manifested in the requested gradient information—given the pose from which they were imaged. (The markings are "aliased"—meaning their fullest details are sub-sampled by the smartphone—in a manner dependent on the pose.) If the gradient information sent to the cloud processor is found to be consistent with the model information, the cloud processor responds to the smartphone with data indicating the license is valid. (If the gradient image does not have the expected evidence of the authentication markings, the cloud processor responds to the smartphone with a contrary message.)

The foregoing and additional features and advantages of the present technology will be more readily apparent from the following detailed description, which proceeds with reference to the accompanying drawings.

BRIEF DESCRIPTION OF THE DRAWINGS

FIG. 6 shows the image of FIG. 5 overlaid with explanatory markings.

FIG. 7 shows an excerpt from FIG. 6, with one pixel in bolded outline.

FIG. 7A shows eight different gradient data associated with the bolded pixel of FIG. 7.

FIG. 8 is like FIG. 7, but with a different pixel in bolded outline.

FIG. 8A shows eight different gradient data associated with the bolded pixel of FIG. 8.

FIG. 9 shows how authenticity of a document bearing the authentication markings of FIG. 4 can be confirmed from imagery.

FIGS. 12, 12A, 13 and 13A are like FIGS. 7, 7A, 8 and 8A, but based on FIG. 11 instead of FIG. 6.

DETAILED DESCRIPTION

Figure 1:
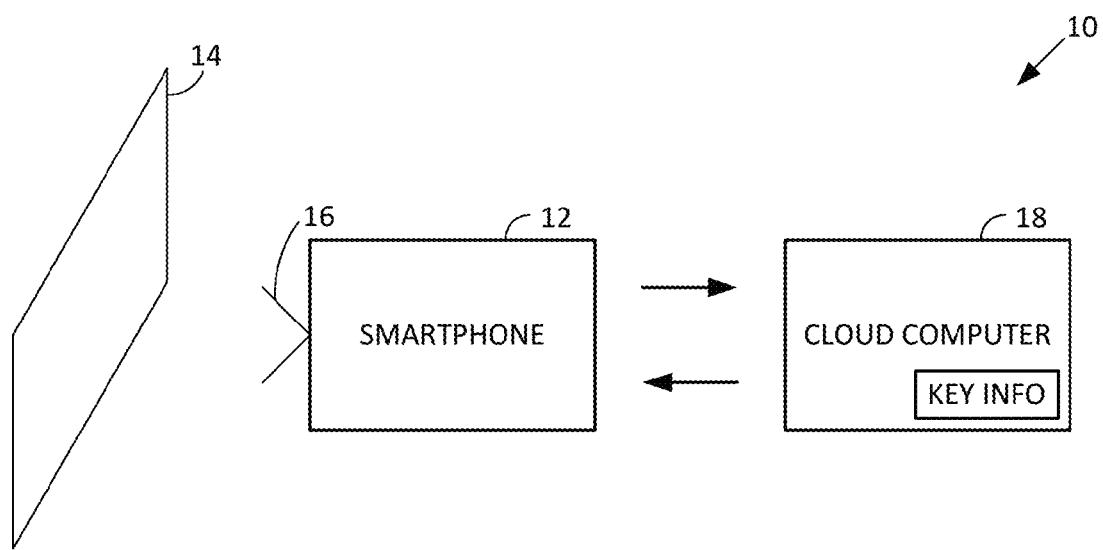
FIG. 1 is a diagram showing certain elements of an illustrative embodiment.

Referring to FIG. 1, a first illustrative embodiment 10 includes a smartphone or other portable consumer device 12, which captures an image of a subject 14 using a camera 16. The smartphone exchanges data with a cloud computer 18, to obtain information about the subject based, at least in part, on the captured imagery.

In one particular embodiment, a processor in the smartphone 12 receives data from the camera 16 corresponding to an image of the subject 14. This image data is processed to yield output data, which may include various components, such as pose information that indicates relative positioning of the subject and the camera, and a set of intra-image gradient information. The smartphone sends at least some of this output data to the cloud computer 18.

In the depicted arrangement, the cloud computer processes the received information—in conjunction with key info that is resident at the cloud computer (or stored elsewhere and accessible to the cloud computer) to produce digital watermark payload information. It then returns this payload information to the smartphone.

By this arrangement, the smartphone obtains watermark information from the imagery, without knowledge of the key information—which resides only in the cloud.

In a variant arrangement, the smartphone 12 does not send a complete set of intra-image gradient information to the cloud computer 18. Instead, the cloud computer identifies a sparse sampling of locations in the imagery captured by the smartphone, and requests gradient information only for these points. In this arrangement, the cloud is free to either randomly choose such locations or have some prescribed scheme for choosing locations—each has its merits. For example, if the cloud knows that the subject matter happens to be a specific package of a pharmaceutical, it may use the pose information to estimate the highest signal areas in an acquired image, itself being further informed by a database containing information about the size and characteristics of the particular package being imaged. Likewise, random locations may be a better choice in applications where systematic cryptographic hacking is a concern. (A time-honored hacking generic principle revolves around the notion of submitting hundreds, thousands or even millions and billions of 'answer requests' into some black box that produces yes and no answers or payload answers, all with the intent of sleuthing the keys inside the black box, in our case the keys in the cloud; In the case of this invention, other higher systematic defenses are available to thwart such hack attempts, where randomized locations are merely a first but solid line of defense).

Figure 2:
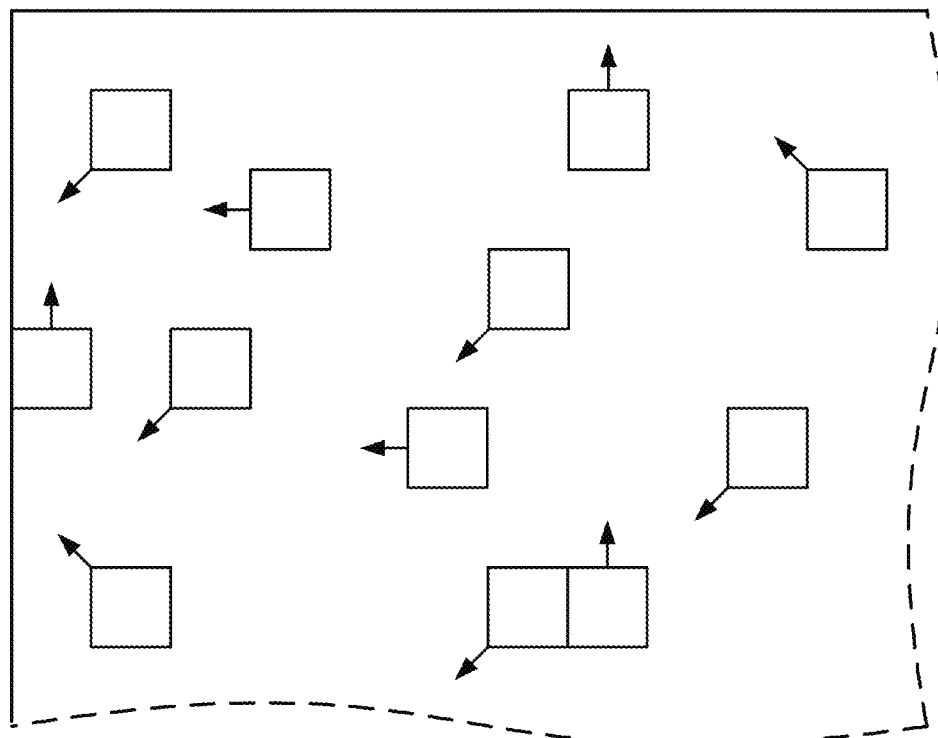
FIG. 2 shows a sparse sampling of pixel locations in an image, each with an associated direction.

FIG. 2 shows such a sparse sampling of image locations. Each of the squares is a pixel location within the imagery captured by the smartphone. The full set of imagery may comprise an array of 1920×1080 pixels, or 2+ million pixels. The sparse sampling of locations identified by the cloud computer typically corresponds to less than half of these pixels—often much less (e.g., less than 10%, or even less than 5%).

The cloud computer can identify the pixel locations by row/column indices, e.g., the set [(2,2) (2,5) (3,3) (3,7) (4,5) (6,1) . . . ]. For each location, the cloud computer can also indicate a direction, such as southwest, west, northwest and north, for which it wants gradient information. (Although each pixel location has eight neighboring locations, only four are needed in this application to avoid redundancy. For example, for adjoining pixels A, B on a row, the gradient from A to the east is the negative of the gradient from B to the west.) The requested direction can be indicated by a number, e.g., 1=southwest, 2=west, etc. Thus, the request for data from the cloud may comprise a list of pixel coordinates—each supplemented with a direction indicator, e.g., [(2,2,1) (2,5,4) (3,3,2) (3,7,3) (4,5,1) (6,1,4) . . . ].

Figure 3:
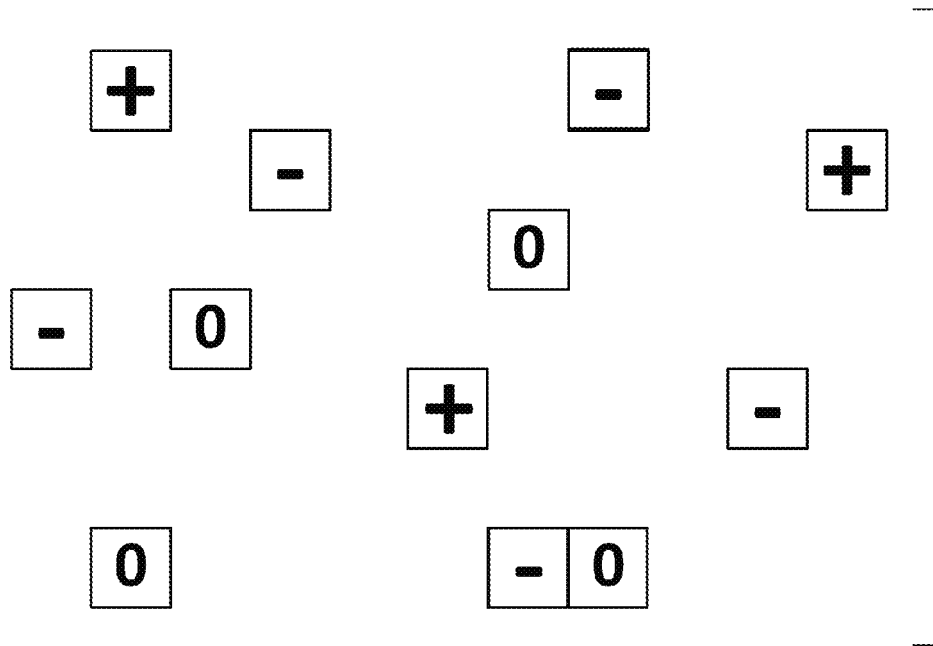
FIG. 3 shows gradient data for the locations/directions shown in FIG. 2.

The smartphone receives this request, and provides gradient information for the requested locations/directions. While a gradient may take the form of a positive or negative number, the cloud computer typically only requires the sign of the gradient (+, − or 0). Sample gradient data for the locations/directions of FIG. 2 are shown in FIG. 3, for a representative image.

To make use of the received gradient information, the cloud computer also needs to know the pose of the subject 14 relative to the camera 16. Knowledge of the calibration signal encoded with the watermark allows this pose information to be discerned. In particular, the affine transformation of the calibration signal in the captured image data corresponds to the affine transformation of the image itself. If the calibration signal comprises a pattern of impulse functions in the spatial frequency domain, it can be found in the captured imagery by transforming the image data to the spatial frequency domain, and thresholding to segregate the peaks. A mapping between the pattern of peaks found in the imagery, versus a reference pattern of impulses associated with the original calibration signal, reveals the affine transformation of the captured imagery. Mathematically speaking, the calibration signal as well as camera lens information can even discern more complicated transformations than "affine," strictly interpreted.

The smartphone processor can perform this operation based on the image data (or the gradient information), with the resulting information then sent to the cloud computer (e.g., with the requested sparse set of gradient data). Alternatively, the cloud computer can discern the pose information from the sparse set of gradient data it receives from the smartphone. (Typically the computed pose information includes X-offset, Y-offset, scale, and rotation information. It may also include projection information, such as shear transformation.)

Knowing the affine transformation of the captured imagery, the cloud computer can decode the watermark payload from the gradient information—since it thereby knows how the expected representation of the watermark payload has been distorted by the geometric transformation. As noted, the cloud computer also uses the key data in this process.

In a second illustrative embodiment, the subject includes authentication markings. These markings are too fine to be printed (or resolved in scanning) by consumer grade equipment, but they can be formed by expensive commercial processes.

Figure 4:
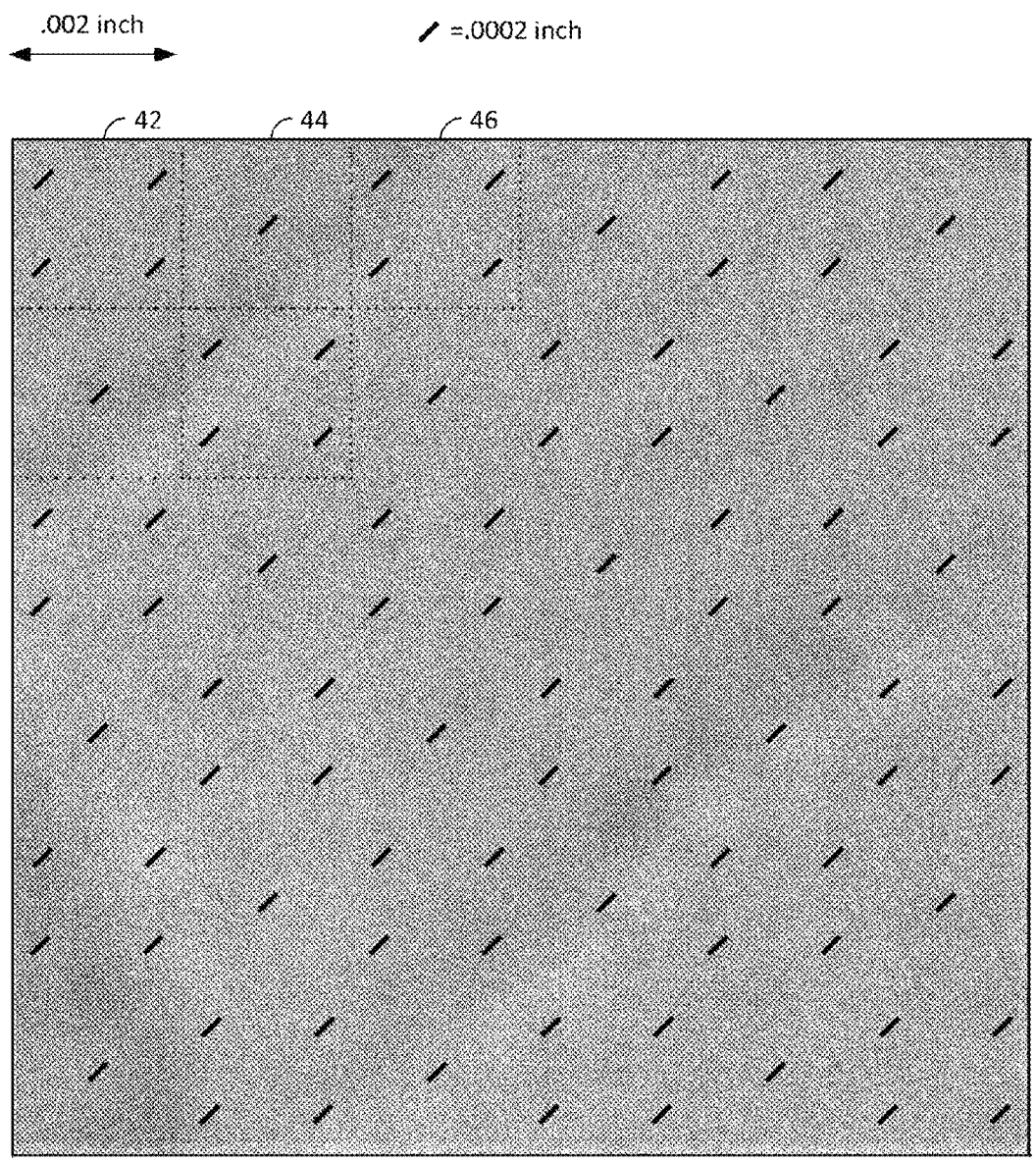
FIG. 4 is a close-up excerpt of an object that has been marked with tiny authentication markings.

FIG. 4 shows an example—taken by a microscopic view of a document surface. In addition to host imagery printed on the document (shown in the background), the document includes small oblique lines. The detailed lines are 0.0002 inches in length, and—as shown—still smaller in width. (The authentication marks may be formed by a system capable of printing at greater than 3000 dots per inch, or more preferably greater than 6000, 9000 or 11000 dots per inch.)

A smartphone may include a camera system that captures an array of 1920×1080 pixels, and may be able to focus as close at 3 inches from a subject. At this distance, the width of a driver's license (e.g., 2.125") fills up the width of the camera image (1080 pixels). Each pixel thus corresponds to an area (cell) on the license that is about 0.002 inches on a side. (A few such cells are outlined in FIG. 4 in dotted lines.)

Figure 5:
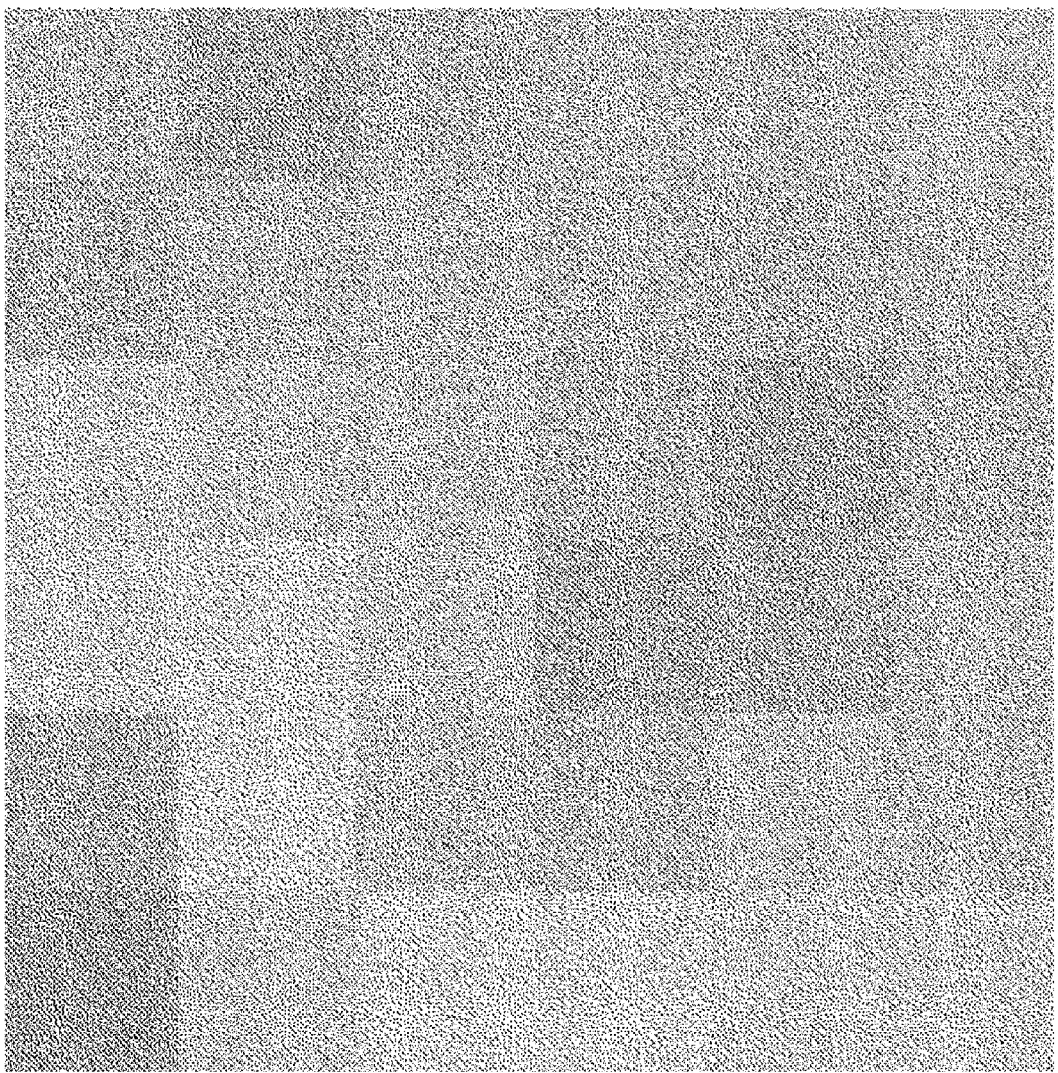
FIG. 5 is an image captured from the object excerpt shown in FIG. 4, without any affine transformation.

FIG. 5 shows imagery captured by a smartphone camera from the FIG. 4 document excerpt. The captured imagery is 6 pixels by 6 pixels. Each pixel has a value equal to the average luminance across one of the 0.002"×0.002" areas of the document. This luminance is a function of the imagery, and is also slightly a function of the authentication markings.

Note that the FIG. 5 image has no affine transformation relative to FIG. 4. Each pixel of the FIG. 5 image exactly corresponds to a single cell area of the FIG. 4 document. There is no shift in X- or Y-, no scale change, and no rotation.

It will be recognized that the authentication markings are arranged in a distinctive pattern. Four marks are in the cell area 42 in the upper left corner. The next cell 44 to the right, however, has just one mark. The cell area 46 next to it again has four marks. And so on across the document.

There is a similar patterning in the vertical direction.

Thus, the values of the 36 pixels in FIG. 5 are subtly biased by these marks. Half of the pixels correspond to document cell areas with four marks; the other half correspond to document cell areas with only one mark—in a checkerboard fashion.

FIG. 6 shows this biasing. The greek letter indicates an average luminance of the host imagery within the cell area to which each pixel corresponds, which is then biased either four arbitrary units or one unit, depending on whether the cell area includes four authentication marks or one. (Although the same letter is used in each pixel, it will be recognized that it has different values in different cell areas.)

FIG. 7 shows an excerpt from the pixel array of FIG. 6 (now omitting the shading), and depicts, in FIG. 7A, the eight different gradients from the pixel outlined in bold. To the north there is a gradient of −3 (i.e., the value of the pixel to the north is 3 arbitrary units less than the bolded pixel). The same relationship holds for gradients to the east, south and west. In contrast, to the northeast the gradient is 0. Likewise with the gradients to the southeast, southwest and northwest.

FIGS. 8 and 8A show the same information for a different pixel—the one directly beneath the bolded pixel of FIG. 7. Again, eight gradient values are shown.

If the document of FIG. 4 is photographed by a smartphone camera, and there is no affine transformation between the original document (a driver's license) and the image projected onto the camera's image sensor (i.e., the captured image corresponds to the encoded image in its nominal affine state), then gradient data like that in FIGS. 7, 7A, 8 and 8A will characterize the smartphone-captured image. (It will be recognized that the camera's imaging optics have a "power" function by which the relatively larger card is imaged onto a relatively larger sensor. This power is disregarded in the present discussion of affine transformation.)

The authenticity of the driver's license can be confirmed by finding evidence of this distinctive pattern of authentication markings. For example, on average, each pixel should have a gradient of zero to the northeast, southeast, southwest, and northwest. Likewise, each pixel should have a consistent, non-zero, gradient to the north, south, east and west. (For some pixels it will be a consistent positive value in all four directions, as in FIG. 8A. For others it will be a consistent negative value in all four directions, as in FIG. 7A. The absolute values of these gradients should all be equal.)

"Average" is the important qualifier here. The gradients from any given pixel will be dominated by the characteristics of the host imagery at that pixel. The authentication markings contribute only a very subtle bias to any given gradient. However, the authentication markings contribute a regular pattern of these biases across all pixels. In contrast, the host image component is not uniformly patterned, but is highly variable. Thus, the east-gradient due to the host image component from one randomly selected pixel is uncorrelated with the east-gradient due to the host image from another randomly selected pixel. Averaged across a large sample of pixels across the image, the east-gradient due to the host image component will be very close to zero. Ditto for each of the other seven gradients. Since these host-image gradients average to zero across any large set of randomly-selected pixels (e.g., 500 or more), all that remains are the residual gradients due to the pattern authentication markings.

Thus, a simple authenticity check is to take a diagonal of 500 or more pixels in the imagery (as partially shown by the bolded pixels of FIG. 9), and average all their gradients in the north, east, south and west directions. "On average," these should have a non-zero number (−3 arbitrary units in the illustrated case). If this value is statistically improbable (e.g., four or more standard deviations away from a similarly average based on a like number of randomly selected pixels), then the presence of the characteristic marking pattern is confirmed, and the document is confirmed to be authentic.

Instead of a continuous diagonal, an authenticity check can be made by examining random pixels in the imagery. If each pixel is denoted by row and column indices, from the set [0, 1, 2, 3 . . . ] (with pixel (0,0) being the top left pixel), then the pixels labeled ξ+4 in FIG. 9 are those where both of the row-column indices are both even, or where both indices are odd (e.g., (0,0), (0,2), (1,1), (1,3), (2,0), etc.). If a set of pixels having this attribute (i.e., row-column indices are both odd or both even) is randomly identified, and the north/east/south/west gradients from the pixels in this set averaged, they should result in a non-zero number (just like along the diagonal in the preceding paragraph). In contrast, their northeast/southeast/southwest/northwest gradients—if averaged—should tend close to zero. Again, statistical thresholds can be set to ensure whatever confidence level (e.g., in terms of false positives or false negatives) is desired.

Such a test could be performed by the smartphone, if it had knowledge of what authentication pattern to look for. However, to deter attack, information about this authentication mark pattern is desirably not shared with every smartphone. Instead, this information is preferably resident in only a few carefully controlled servers at a government data center, i.e., computers in the cloud.

Figure 10:
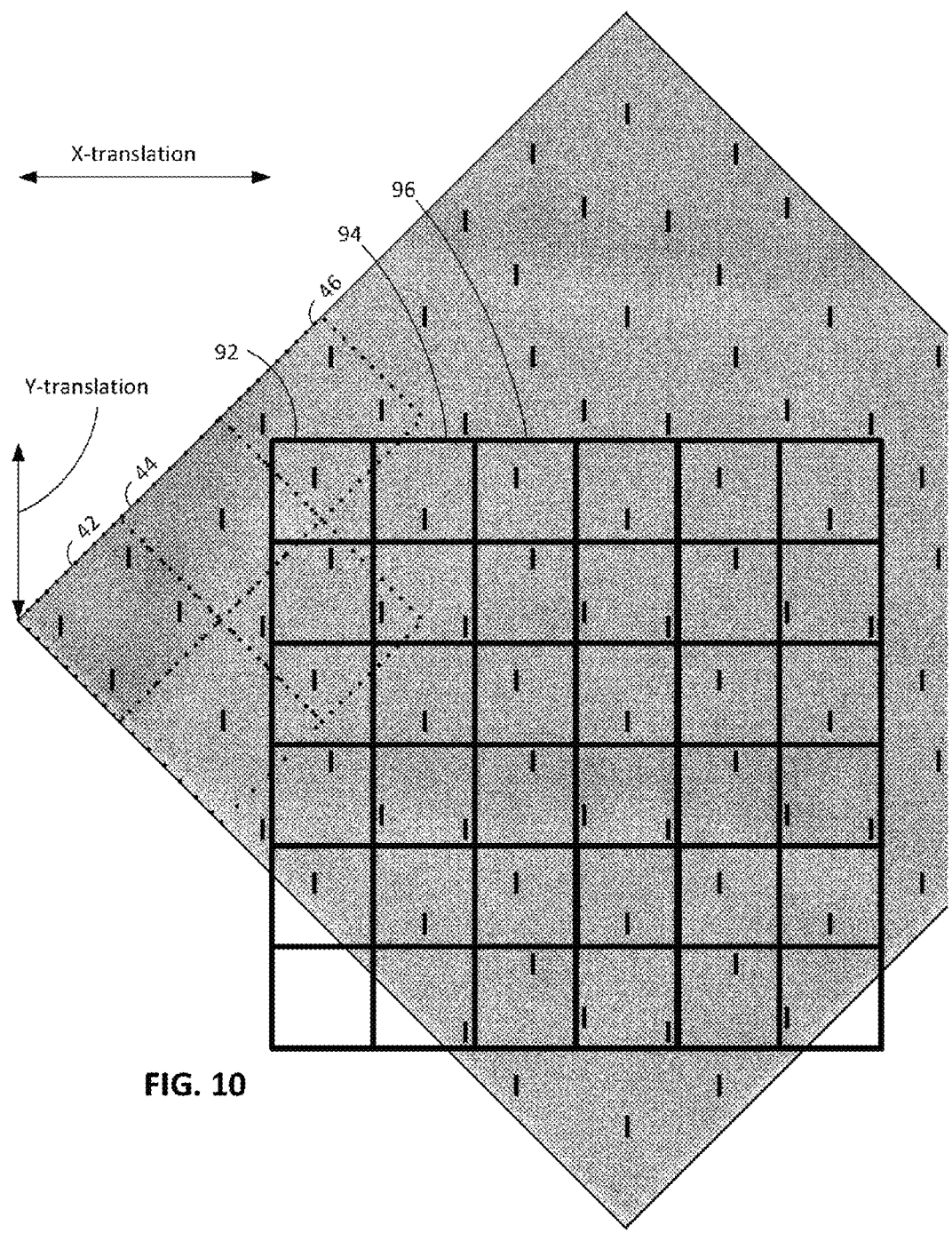
FIG. 10 shows how an image may be captured from the object of FIG. 4, introducing affine distortion (X- and Y-translation, rotation and scaling).

Now consider the effects of affine distortion on the authentication pattern, e.g., by reference to FIG. 10. Again, a smartphone has imaged the document of FIG. 4, but the captured pixels do not correspond in the same manner to the cell areas of the document as in FIG. 5. (For clarity of presentation, only an excerpt of the captured imagery is shown.) Instead, the captured imagery has a rotation of 45 degrees relative to the document. (In this case, the document has been rotated). The captured imagery has also been scaled by a factor of 1.414, relative to the nominal affine state depicted in FIG. 4. Moreover, the captured imagery is translated in X- and Y-dimensions, relative to the document. (Translation, in this embodiment, is judged relative to the upper left hand corner of the document.)

This affine transformation causes aliasing. That is, the different sampling between FIG. 10 and FIG. 5 introduces artifacts in the sampled pixel values. Whereas the cells 42, 44, 46, etc., in the top row in FIG. 5 were alternatively biased by the presence of 4 and 1 authentication markings (4,1,4,1 . . . ), the cells 92, 94, 96, etc., in the top row in FIG. 10 are each biased by the presence of 1 authentication mark (1,1,1,1 . . . ).

Likewise, whereas the cells in the second row in FIG. 5 were alternatively biased by the presence of 1 and 4 authentication marks (1,4,1,4 . . . ), the cells in the second row of FIG. 10 are alternately biased by the presence of 1 and 2 authentication marks (1,2,1,2 . . . ).

Figure 11:
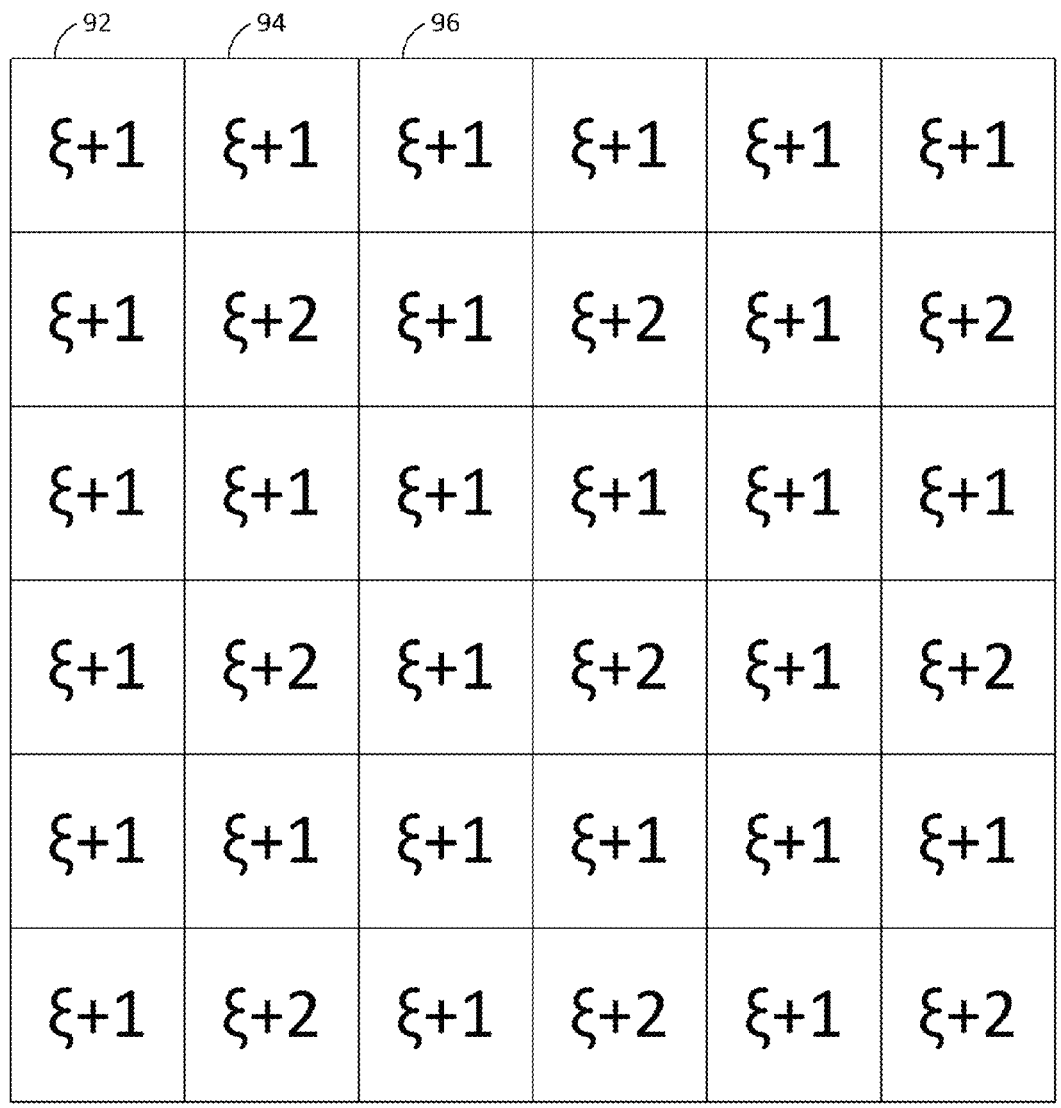
FIG. 11 is like FIG. 6, but is based on the image captured in FIG. 10 with translational affine distortion.

These biases to the individual pixels are depicted by FIG. 11 (which corresponds to FIG. 10 in the same manner as FIG. 6 corresponds to FIG. 4).

The camera pixels are incapable of resolving the individual authentication marks. The individual marks are lost when each camera photosensor integrates photons received from a corresponding cell area of the document. Details inside the cell area simply contribute to its average luminance/chrominance value. From the captured pixel data (e.g., as in FIG. 5), it is impossible to deduce the details of the original authentication marks included in the corresponding document cell areas. Imaging by the camera thus serves as a one-way function on the data; the input document cannot be reproduced from the output imagery. The introduction of affine state transformation further compounds the unsleuthability of this one-way function.

FIGS. 12-13A detail the gradients from two adjoining pixels in the aliased imagery of FIG. 11. FIGS. 12 and 12A show that for pixels in odd-numbered columns of odd-numbered rows (e.g., column 1, row 1, shown bolded), the gradient is −1 in all eight directions. In contrast, FIGS. 13 and 13A show that for all other pixels (excluding, of course, edge pixels), the gradients is +1 to the north and south, and 0 in the other six directions.

If the cloud computer has information about the original pattern of authentication marks, and it knows the pose information by which the marked object was imaged, it can model these aliasing effects introduced by the affine distortion, and indicate whether the imagery captured by the camera is from an authentic driver's license.

As before, the cloud computer requests and receives gradient data from the smartphone, for a set of locations (and associated directions) in the image. It also receives from the smartphone, or calculates itself, pose data. In the FIG. 10 example, the cloud computer thus knows the rotation and scale parameters for the captured pixels, relative to their nominal states in the originally-encoded document.

With this knowledge of affine state, the cloud computer models how the pattern of authentication marks (which it knows by accessing reference information stored in the cloud) will be aliased when sampled by a camera that introduces such affine distortion. The cloud computer then judges the gradient information received from the smartphone against the result of such modeling, to determine whether the captured imagery includes the authentication marks. A corresponding response is then sent to the smartphone.

In the FIG. 10 example, the cloud computer can ask for a sampling (e.g., 500) of gradient values, in random directions, for pixels found at the intersection of odd rows and odd columns. These gradients should, on average, have a non-zero value (due to the negative one gradients in all directions shown in FIG. 12A). The cloud computer can ask for a similar sampling of gradient values—in all directions except north and south, for pixels not found at the intersections of odd rows and odd columns. These gradients should, on average, have a zero value (due to the zero gradients in those six directions, shown in FIG. 13A). Again, statistical thresholds are set based on the particular application requirements.

If the smartphone provides the pose information to the cloud computer, the cloud computer can select particular gradients based on the aliasing it expects to see in those circumstances (e.g., gradients from pixels at odd rows and columns, in the example just given). If the pose information is computed by the cloud computer, then the cloud computer will typically select random pixels for which it wants gradients from the smartphone, and will determine how to analyze such data once it has computed the pose information.

In some embodiments the smartphone provides—or the cloud computer otherwise has access—to information about the camera system employed by the smartphone. For example, this information can include an identifier by which a camera model can be determined, whether the camera applies image compression, and/or a modulation transfer function of the camera's lens system. The cloud computer can then take such information into account as it selects gradients to be requested from the smartphone, and/or as it models how the authentication markings will be manifested in the image-based data it receives.

Thus, in the just-described arrangements, the cloud computer predicts the aliasing artifacts that should arise from a given imaging circumstance (e.g., camera pose—optionally with camera information), and then checks a sampling of data from the smartphone to determine whether those predicted artifacts, in fact, are present. A consumer smartphone camera thus serves as an optical front end for a detection system that may judge features an order of magnitude (or more) finer that the pixel resolution of the camera.

Further Disclosure

The watermark decoding arrangements detailed in the cited patent documents analyze image data to sense the distortion of known registration signals, thereby indicating the affine transformation (distortion) of the captured image—relative to its state when originally encoded.

In one particular implementation, the registration signals comprise a constellation of known impulse functions in the spatial frequency domain. The geometric transformation of this constellation of impulse function corresponds to the geometric transformation of the image data in which they are found.

This transformation is commonly characterized by multiple parameters. An exemplary set of six parameters includes rotation and scale, together with a 2D matrix of 4 elements that defines a linear transformation (e.g., shear mappings, translations). This matrix defines the mapping between the location of each pixel x,y to a resultant location x',y' after a linear transform has occurred. (The artisan is presumed familiar with such affine transforms.)

Once the transformation of the image is thus-understood, the transformation of any encoded watermark is similarly known—since the watermark is transformed in tandem with the image that conveys it.

The watermark decoder applies this knowledge of how the encoded watermark has been transformed, to recover the watermark signal. In some embodiments, a corresponding inverse-transformation is applied to the image data to restore it to its as-originally-encoded state, and the watermark is then decoded. In other embodiments, the image data is left is its as-transformed state, and the watermark detection algorithm is adapted to look for the watermark in its as-transformed state.

Additional such technology is detailed in patent documents 20040105569, 20040101157, and 20060031684.

In accordance with a further aspect of the present technology, data corresponding to imagery captured by a portable device is transmitted to a cloud processing system. There, an initial estimate of the parameters characterizing image transformation (i.e., a baseline transformation) is iteratively altered to optimize a figure of merit (or to minimize a figure of de-merit) associated with decoding of the watermark.

(The initial estimate of the transformation parameters can be made by the portable device processor, and transmitted to the cloud processing system with the image data. Alternatively, the initial transformation estimate can be made by the cloud processing system.)

In one particular implementation, a simplex search algorithm is used, and the figure of merit is a measure of correlation between the received image data, and an expected set of image data (i.e., expected, given the 6D vector).

In essence, the different parameters of the 6D vectors are individually adjusted. After each adjustment, the correlation is measured. If the correlation has improved, the adjustment is a good one, and the revised 6D vector is taken as a new baseline. A further adjustment is then made (to the same parameter, or another), to again see if the correlation improves. This process continues so as to virtually explore the 6D space of parameters, to identify the combination of parameters that yields the best figure of merit.

An exhaustive search across a 6D parameter space can be done, but often is not. If correlation diminishes with a particular adjustment (e.g., an increase in one parameter), then further adjustments of that parameter in that (increasing) direction needn't be fully pursued. (However, the process desirably checks that the search process isn't fooled by local maxima of correlation within the 6D search space—foothills that might hide the true peak of correlation from being discovered. Thus, some exploration beyond an inflection point of reduced correlation is typically conducted, but with a sparser search sampling.)

The simplex algorithm is desirable due to its efficiency in discarding sub-optimal solution spaces, and identifying the optimal solution. However, other known functional optimization techniques, or non-linear optimizations, can naturally be used.

As is familiar to artisans, cloud computers aren't subject to the battery constraints of portable devices (e.g., smartphones and headword apparatuses). Nor are they subject to the single- or limited-thread execution that typifies such devices, nor their single- or limited-core core hardware (e.g., high end smartphones presently top out at about four cores). As a consequence, a cloud processor can apply processing resources that are ten, a hundred, a thousand, or more times greater than can be applied by such a portable device. (Processing resources can be quantified by various metrics, including instructions per second, available memory, number of cores, number of threads, etc.)

Another View

Aspects of certain embodiments of the present technology may be further understood by reference to the following equation:

$$O(M_a(S_{sn}))::O(X)$$

"O" is the oct-axis filtering function, which outputs plural tri-state values: +1, 0 or −1. For example, each oct-axis-filtered pixel may yield four new independent values, corresponding to the relation between the pixel value, and the value of the pixel to the: right, lower-right, lower, and lower-left. (The other four directions are redundant of those from right/lower-right/lower/and lower-left values for an adjoining pixel.)

"X" represents the raw digital values from the phone's photodetectors (e.g., M rows by N columns of sample values). They can be luminance, chrominance, Bayer pattern data, etc.

"$S_{sn}$" is a supra-Nyquist composite authentication signal, i.e., a signal whose presence—if detected—indicates that the document is the original.

$M_a$ is a print-to-lens-to-photodetector model of how S gets first printed and then transformed by a camera/photo-detector, into digital values. It is operated on knowing the affine state of S (and even higher warped-sheet transforms as well) relative to the camera. The calibration signal gives this affine-warp information.

"::" is a simple comparison operator that gives weights to the logical states of the left and right side of the equations (e.g., {+1,+1}, {−1, −1}, {+1,0}, {+1,−1}, etc.). That is, each individual oct-axis datum from the acquired photodetector information (i.e., the right side of the equation) is compared with its modeled estimate (i.e., the left side of the equation).

The end result of summing up all 4*M*N of the weighted comparisons is then subjected to a "is-it-there-or-not?" threshold test.

A different review of the technology posits a document formed with an image signal "I," and two imperceptible signals: "S" and "$S_{DWM}$." "S" is the authentication signal discussed above; $S_{DWM}$ is a digital watermark signal including a calibration signal (and optionally conveying payload data).

When the camera captures raw samples from the document, the samples are dominated by the image signal "I." These samples are submitted to a detector module that outputs the above-discussed six parameters (defining the mapping between the location of each original pixel x,y to a resultant location x',y' in the sampled signal), based on its analysis of the calibration signal in $S_{DWM}$.

The detector module (or another module), has knowledge of the "S" signal that should be found in an authentic document. It also has a model of the sampling function involved, e.g., how the camera and photodetectors transduce the printed signal, considering the 6D mapping function. The model transforms the authentication signal S into a signal X.' That is, X' is the system's best guess of how raw data vector X ought to be represented in the raw data sampled by the camera system.

Oct-axis filtering is applied both to this modeled data, and also to the raw data actually sensed by the camera. Four output values are produced for each pixel in the modeled data, and for each pixel in the sampled data. Corresponding pixels are identified, and their respective four oct-axis values are paired, yielding four data pairs for each pixel (e.g., {+1,+1}, {+1,0}, etc.).

The data in each pair are compared. If they match, that's good—the sampled data matches the model. If they differ by one (e.g., {+1,0}), that's not so good. If they differ by two (e.g., {+1,−1}), that's bad. Each different outcome can be assigned an arbitrary weight. In one arrangement the weightings may be:

{+1,+1} 2
{−1,−1} 2
{+1,0} −1
{0,+1} −1
{−1,0} −1
{0,−1} −1
{−1,+1} −2
{+1,−1} −2
{0,0} 0

In another arrangement the weightings may be:

{+1,+1} 2
{−1,−1} 2
{+1,0} 1
{0,+1} 1
{1,0} 1
{0,−1} 1
{−1,+1} −2
{+1,−1} −2
{0,0} −1

Each pixel contributes four such weighted values, depending on the four pairs of data. These weighted values are summed across all the pixels that are so-processed, yielding a scalar value. This scalar value is compared with a scalar threshold. If the summed value exceeds the threshold, the system determines that "S" is present, and the document is authentic. If the summed value does not exceed the threshold, then the system concludes otherwise.

Multiple different image captures may be performed by the camera, and the foregoing operation may be repeated for each. The results can be combined, and a further thresholding applied. (e.g., if ten image captures are performed, and the signal S is determined to be present in eight or more of them, then S is finally concluded to be present).

It is helpful to contrast the foregoing arrangement with that used in prior art watermark detectors. In prior art detectors, oct-axis filtering is used to mitigate the effects of the host imagery on the steganographically-encoded data. The filtering reveals the small-scale variation in values between adjoining pixels, e.g., identifying whether a pixel is a relative maxima or minima relative to its neighbors. The pattern of such detected lumpiness in tiled square areas across the image conveys the encoded information (e.g., the calibration signal and the payload data). The present arrangement, in contrast, does not employ the oct-axis information for the purpose of discerning a pattern of small-scale lumpiness across areas of the imagery (although other aspects of the particular implementations—involving conventional watermark reading—do so). Rather, the present arrangement employs this information as the basis of comparison between modeled and actually-sampled data—to determine a measure of correspondence between the two.

Moreover, in conventional watermark detectors, no individual use is made of the components that comprise the oct-axis data for a single image sample (e.g., comparing the image sample value to values to the right, lower-right, lower, and lower-left). These components are combined to yield a net oct-axis value for the pixel, but nothing more. In the detailed arrangement, in contrast, these components may be compared between modeled and sampled image data.

Still further, in the prior art, information is encoded by biasing the values of pixels (or multi-pixel watermark elements, termed waxels) to values above or below their adjoining neighbors (providing the above-mentioned small-scale lumpiness that conveys the information). Such biases are revealed in the decoder by the oct-axis value for a pixel (or waxel). If such an oct-axis value is equal to 0, it conveys no information, and is disregarded. In contrast, component oct-axis values of 0 in the present technology are typically considered in evaluating the above-detailed comparisons.

Yet further, oct-axis is used in the prior art to discern whether a pixel (or waxel) has been biased to have a value above or below its neighbors. That is, each pixel (waxel) is discerned to have a relative "+" or "−" state (again, 0 is ignored). Although the degree of positive or negative bias is computed in the oct-axis filter, ensuing operations work simply on the 2D pattern of net "+" and "−" determinations. The present technology, in contrast, can produce more than two such output states in its use of the oct-axis information. For example, the first weighting arrangement detailed above has values which can have four states (i.e., −2, −1, 0, and 2). The second weighting arrangement also has values which can have four states (i.e., −2, −1, 1 and 2). Other weighting arrangements can have three states (e.g., −2, 1 and 2), or more than four states (e.g., −2, −1, 0, 1 and 2). Two states can also be used, although this is not preferred. Numerous other arrangements are naturally possible.

Review

It will be recognized that the present specification spans a great variety of different embodiments. A small sampling of illustrative embodiments is reviewed below.

One embodiment employs sampled image data captured from a suspect object using a photodetector in a user device. This suspect object has an object pose relative to the photodetector. This embodiment works by using a hardware processor to model (estimate) image data that would be produced if a genuine object were imaged by the photodetector, given the object pose. This modeled image data, and the sampled image data captured from the suspect object, are processed. This processing includes comparing multiple pairs of data—each pair including a datum based on the modeled image data and a datum based on the sampled image data. This processing yields an output value corresponding to each of the comparisons. These output values are combined to yield an authenticity metric useful in determining whether the suspect object is a genuine object.

Another embodiment useful for judging authenticity of a suspect object involves receiving data corresponding to an image of said object, captured by a camera of a consumer device. The suspect object includes authentication features (which the consumer device may be incapable of resolving). The received image data is processed (e.g., by a processor in the consumer device) to yield output data that includes a set of intra-image gradient information. At least some of this output data is sent to a remote system. In response, data is received indicating whether the object includes the authentication features.

A further embodiment involves receiving data corresponding to an image of a subject, captured by a camera of a consumer device. The received data is processed (e.g., by a processor in the consumer device) to yield output data, which includes: (a) pose information indicating relative positioning of the subject and the camera; and (b) a set of intra-image gradient information. At least some of this processed output data is sent to a remote system. Responsive information is then received, based on information decoded from the gradient information through use of (a) the pose information (b) the set of intra-image gradient information, and (c) key information not known to the portable consumer device.

Still another embodiment involves sending data from a first system to a remote second system, where the sent data identifies an incomplete subset of locations in an image of a subject. Intra-image gradient information is received from the remote second system. This intra-image gradient information comprises gradient data at the identified incomplete subset of locations in the image. Pose information about a spatial relationship between the subject and a camera that captured the image is obtained. The method further includes processing (a) the received intra-image gradient information, (b) the pose information, and (c) key information, to yield result data. (Typically, the key information is not available to the remote second system.) This result data (or some part of it) is then sent from the first system.

Yet another embodiment involves receiving data corresponding to imagery captured by a user device camera from an object having certain features. By reference to known information about these features, and information about a known pose of the object relative to the camera, imagery that should be captured by said camera from the object. The process then compares data corresponding to the predicted imagery with the received data, in determining whether the object is authentic. In some such embodiments, the imagery captured by the camera includes aliasing artifacts (due to inadequate sampling of features on the object by the camera), and the predicted imagery likewise includes such aliasing artifacts.

Still a further embodiment includes sending information based on imagery captured by a user device, to a remote system, where the sent information is inadequate to reveal a subject depicted in said imagery to the remote system. In response, the user device receives information decoded by the remote system from the sent information using secret information, where the secret information is kept secret by the remote system (i.e., it is withheld from the user device).

The foregoing methods are typically described from the viewpoint of a consumer/user device, or from a remote system that exchanges information with such a device. It will be recognized that each of these methods can reciprocally be viewed from the standpoint of the other device/system.

Concluding Remarks

The pattern of authentication markings shown in FIG. 4, etc., was chosen for clarity of illustration and expository convenience. In other implementations, more complex markings can naturally be employed. Some alternate markings may not be visible to human vision even under a microscope, e.g., due to their dispersion as subtle ripples in luminance or chrominance across larger areas of imagery. In some such arrangements the pattern of markings is evident in a transform domain, such as a wavelet or spatial frequency domain (just as the preferred calibration signal is defined and processed in the spatial frequency domain). Indeed, the authentication markings can comprise impulse functions at high spatial frequencies—too high for reproduction by consumer grade cameras, scanners and printers. (The limit of such consumer grade devices is regarded to be 2400 dots per inch.)

Similarly, while the detailed description considered how the illustrated pattern of authentication markings is aliased by simple translation, rotation and scale transformations, it will be recognized that more complex forms of geometric distortion can similarly be modeled, so that the cloud computer can recognize the markings despite complex combinations of transformations (e.g., using familiar principles of homography).

While the disclosure particularly considered degradation of the authentication marks by the act of image capture (scanning), a similar degradation occurs if a digital file representing a document containing the authentication marks is rendered using a consumer grade printer.

In the detailed embodiment, the calibration signal allows the pose information to be resolved to sub-pixel metrics (e.g., it can resolve translations in X- and Y- to one-tenth of a pixel from nominal values). The required accuracy of pose information depends on the type and scale of authentication markings used.

Various references was made to random selections, e.g., of pixels and image locations, in the detailed embodiments. Randomness is not required in other embodiments.

While the detailed arrangements involve imagery captured with a user's smartphone camera, this is not essential. For example, implementations of the present technology can utilize image data obtained otherwise, such as electronically transmitted from another source (e.g., a friend's smartphone), obtained from a document scanner, obtained from the web, etc.

Likewise, while the foregoing description detailed certain processing being performed by certain devices, this is not essential. Such processing tasks can be shared in different manners between devices, or still other devices can be employed. Relatedly, the detailed processing can be performed by application software on the devices, or same can be performed by operating system services, or a combination.

While the detailed arrangement determined the object pose by reference to a steganographically encoded calibration signal, in other embodiments other techniques can be used. (One such other technique is to use visible reference markings of known dimension and orientation.)

It will be recognized that the comparison of oct-axis values between the sampled and the modeled data may be performed across the entire image, or may perform such processing just on one or more sub-parts of the image. Likewise, the output values produced by the comparisons may all be combined in yielding a final authenticity metric, or only a subset of those values may be so-combined.

Although the preferred embodiments employ authentication features that are too small to be resolved in imagery captured by mobile phone cameras, this is not essential. The authentication features may be visible and readily distinguishable. Yet if reproduced, e.g., in a second generation object, they will be distorted in very subtle manners. The detailed authentication technology is sensitive to such small corruptions, and will properly flag the object as not the original. In some embodiments, the authentication features simply comprise known features that are pre-existing in the object, rather than features that are especially added for authentication purposes.

The focus of this disclosure has been on still imagery. But it will be recognized that the detailed technologies can likewise be employed with video and audio content.

In the illustrative embodiments, the smartphone commonly encrypts all transmissions to the cloud computer using a public key associated with the cloud computer. The cloud computer decrypts such transmissions using its complementary private key. Similarly, the cloud computer typically encrypts all transmissions to the smartphone using a public key associated with the smartphone. The smartphone then decrypts such transmissions using its respective private key.

It should be understood that features and arrangements detailed in connection with one embodiment can likewise be incorporated into other embodiments. Such combinations and permutations are not exhaustively detailed, as their implementation is straightforward to the artisan—based on this disclosure.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S III phone, manufactured by Samsung, the Motorola Droid Razr HD Maxx phone, and the Nokia N900), and Windows 8 mobile phones (e.g., the Nokia Lumia 920).

(Details of the iPhone, including its touch interface, are provided in Apple's published patent application 20080174570.)

Fingerprinting technologies can, in some instances, be substituted for watermarking technologies. For example, instead of a smartphone decoding a watermark from driver license imagery—to determine its issuing state and an associated URL, a fingerprint can be calculated from part of the imagery instead (i.e., imagery that is standard across all licenses from that issuing state—not the variable portrait data). The fingerprint data can be matched against reference information in a database to determine the issuing state. A lookup table can then provide the associated URL—given the issuing state.

SIFT, SURF, ORB and CONGAS are some of the most popular image fingerprinting algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv: 0804.4457, 2008.) Use of such technologies to obtain object-related metadata is likewise familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's U.S. Pat. Nos. 6,947,571 and 7,206,820.

The arrangements detailed herein can be implemented using wearable computing systems, including headworn devices. Such devices typically include both cameras and display technology by which computer information can be viewed by the user—either overlaid on the scene in front of the user (sometimes termed augmented reality), or blocking that scene (sometimes termed virtual reality), or simply in the user's peripheral vision. Exemplary technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The design of smart phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, 3-axis gyroscopes, a microphone, etc., together with software instructions for providing a graphical user interface), interconnections between these elements (e.g., buses), and an interface for communicating with other devices (which may be wireless, such as GSM, CDMA, 4G, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc.).

More generally, the processes and system components detailed in this specification may be implemented as instructions for computing devices, including general purpose processor instructions for a variety of programmable processors, including microprocessors, (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Commonly, each device includes operating system software that provides interfaces to hardware resources and general purpose functions, and also includes application software which can be selectively invoked to perform particular tasks desired by a user. Known browser software, communications software, photography apps, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

In the interest of conciseness, the myriad variations and combinations of the described technology are not cataloged in this document. Applicant recognizes and intends that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method useful for judging authenticity of an object by reference to features encoded therein, the method being performed by a camera-equipped consumer device that captured an image of the object, and also involving a remote system that has key data that is not available to the consumer device, the method comprising the acts:

processing data corresponding to said image, said processing including computing intra-image gradient information for plural pixel locations in the image, said computing including comparing, for each of said pixel locations, a value of a pixel at said location with values of one or more neighboring pixels, said computing yielding a value that can be represented with five bits as the intra-image gradient information for said pixel location, said processing being performed by a processor in the consumer device configured to perform such act;

sending the computed intra-image gradient information for N pixel locations in the image to the remote system, where N is less than all the pixel locations in the image, and the sent intra-image gradient information consists of one value for each of said N locations; and in response to said sending, receiving data at the consumer device indicating whether the remote system was able to confirm the presence of said features in said object from said sent intra-image gradient information;

wherein the consumer device learns whether the object depicted in the captured image includes the encoded features—while not having key data necessary for such determination, thereby enhancing security; and wherein the remote system determines whether the object depicted in the captured image includes the encoded features—while not having access to the complete captured image, thereby enhancing privacy.

2. The method of claim 1 that includes generating pose information including X-offset, Y-offset, scale, and rotation information, said pose information indicating relative positioning of the object and the camera.

3. The method of claim 2 that includes generating said pose information by analysis of the data corresponding to the image performed by the consumer device, and sending said generated pose information from the consumer device to the remote system.

4. The method of claim 1 that further includes the consumer device receiving information sent by the remote system that provides specifications for the intra-image gradient information to be sent by the consumer device to the remote system.

5. The method of claim 1 wherein N is less than half the pixel locations in the image.

6. The method of claim 1 wherein N is less than ten percent of the pixel locations in the image.

7. The method of claim 1 wherein said features are too small to be distinguished in the image captured by said camera.

8. The method of claim 1 in which the sending act comprises sending a five bit integer for each of said N pixel locations.

9. A method useful for judging authenticity of an object by reference to features encoded therein, the method being performed by a remote system, and also involving a camera-equipped consumer device that captured an image of said object, the method comprising the acts:

receiving information at the remote system, sent from the consumer device, the received information including intra-image gradient information computed by the consumer device for N pixel locations in said image of the object, where N is less than all the pixel locations in the image, said intra-image gradient information consisting of one value for each of said N locations;

with a hardware processor in the remote system, processing (a) the received intra-image gradient information, and (b) key information, to yield result data, the key information not being available to the camera-equipped consumer device; and sending at least some of the result data from the remote system to the consumer device, to confirm the presence of said features encoded in the object;

wherein the consumer device learns whether the object depicted in the captured image includes the encoded features—while not having key data necessary for such determination, thereby enhancing security; and wherein the remote system determines whether the object depicted in the captured image includes the encoded features—while not having access to the complete captured image, thereby enhancing privacy.

10. The method of claim 9 that further includes:

obtaining pose information about a spatial relationship between the object and the camera of the consumer device;

processing (a) the received intra-image gradient information, (b) key information, and (c) the pose information, to yield said result data.

11. The method of claim 10 in which obtaining the pose information comprises receiving the pose information from the consumer device.

12. The method of claim 10 in which obtaining the pose information comprises calculating the pose information at the remote system, from the received intra-image gradient information.

13. The method of claim 10 in which the pose information comprises X-offset, Y-offset, scale, and rotation information.

14. The method of claim 9 that further includes sending data from the remote system to the consumer device, the sent data providing specifications for the intra-image gradient information to be sent by the consumer device to the remote system.

15. The method of claim 9 in which N is less than half the pixel locations in said image.

16. The method of claim 9 in which N is less than ten percent of the pixel locations in said image.

17. The method of claim 9 wherein said features are too small to be distinguished in the image captured by said camera.

18. A non-transitory computer readable medium containing instructions that configure a computer system to confirm the presence of features encoded in an object, to aid in judging authenticity of the object, the object being depicted in an image captured by a camera-equipped consumer device, by performing acts including:

receiving information at said computer system, sent from the consumer device, the received information including intra-image gradient information computed by the consumer device for N pixel locations in said image of the object, where N is less than all the pixel locations in the image, said intra-image gradient information consisting of one value for each of said N locations;

processing (a) the received intra-image gradient information, and (b) key information, to yield result data; and sending at least some of the result data from the computer system to the consumer device, to confirm the presence of said features encoded in the object;

wherein the consumer device learns whether the object depicted in the captured image includes the encoded features—while not having key data necessary for such determination, thereby enhancing security; and wherein the remote system determines whether the object depicted in the captured image includes the encoded features—while not having access to the complete captured image, thereby enhancing privacy.

19. The computer readable medium of claim 18 in which the received intra-image gradient information is for less than half of the pixel locations in said image of the object.

20. The computer readable medium of claim 18 in which the received intra-image gradient information is for less than ten percent of the pixel locations in said image of the object.

\* \* \* \* \*